United States Patent Office 3,427,581
Patented Feb. 11, 1969

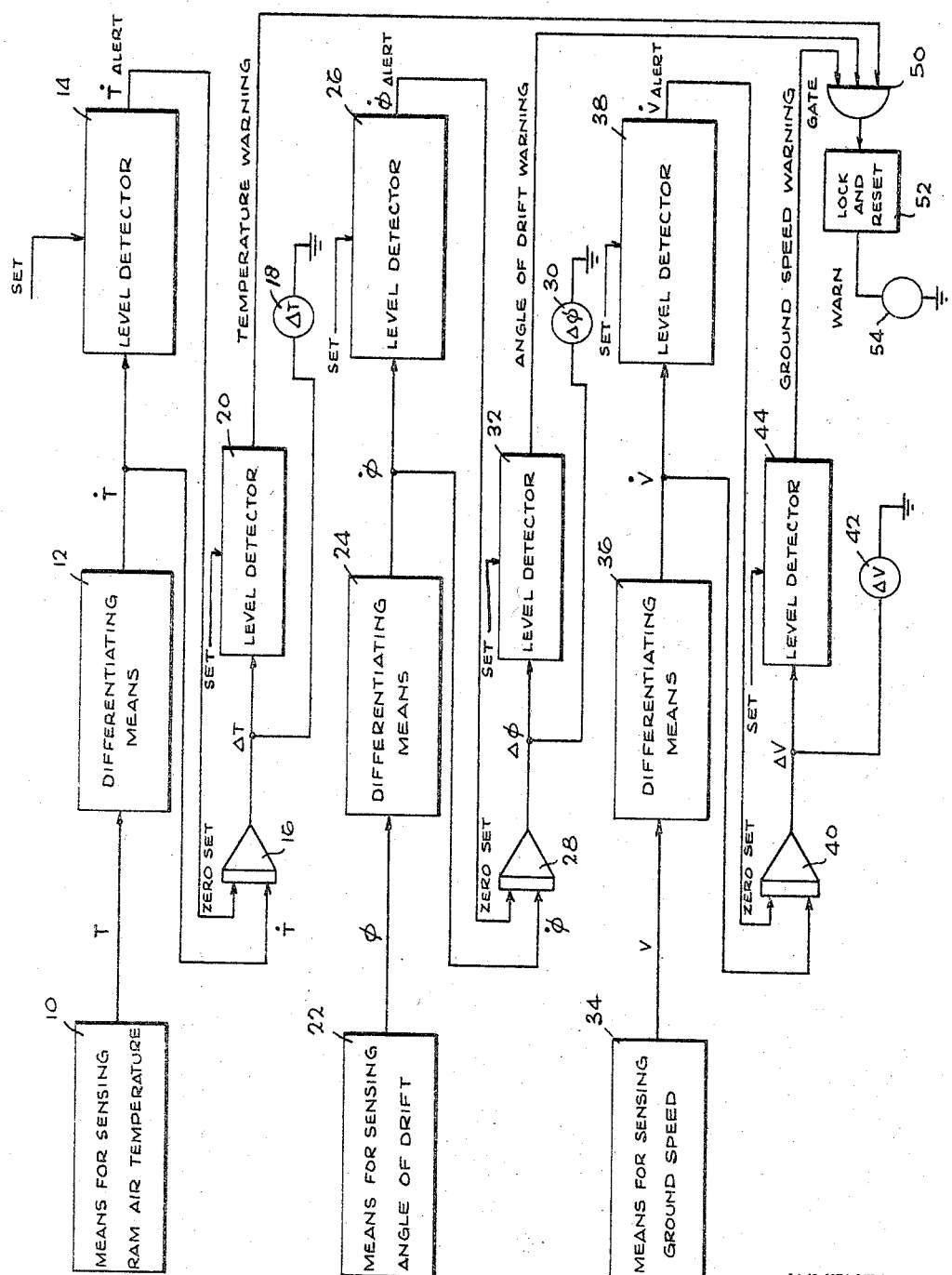

3,427,581
CLEAR AIR TURBULENCE DETECTOR
Richard H. Hartman, Woodland Hills, Calif., assignor to Litton Systems, Inc., Beverly Hills, Calif.
Filed Aug. 4, 1965, Ser. No. 477,221
U.S. Cl. 340—25          10 Claims
Int. Cl. G08g 5

ABSTRACT OF THE DISCLOSURE

This invention comprises a means for monitoring a plurality of parameters that are indicative of clear air turbulence, e.g., ram air temperature, angle of drift, cross-track velocity, and ground speed. Means are also provided for differentiating signals indicative of the above-mentioned parameters to obtain the time rates of change of those parameters. Further means are provided to compute the change in each of the parameters during the period when its associated time rate of change exceeds a predetermined magnitude. When the change in the parameters, during the period its associated time rate of change exceeds a predetermined magnitude, also exceeds a predetermined amplitude, a signal is generated indicative of the presence of clear air turbulence.

---

This invention pertains to a clear air tubulence detector, and more particularly, to a plurality of computing channels each of which is adapted to detect a change in a predetermined parameter associated with clear air turbulence.

One of the important problems in the operation of high speed, high altitude aircraft is the sensing of clear air turbulence, i.e., turbulence which cannot be detected by the presence of water vapor, and the like. When an aircraft, particularly a high speed aircraft, hits a wind shear, severe turbulence may result which can damage or destroy the aircraft.

As an aircraft approaches a region of clear air turbulence, the ram air temperature sensed increases or decreases, and/or the ground velocity of the aircraft increases or decreases, and/or the angle of drift increases or decreases.

The device contemplated by this invention senses the ram air temperature change, change in angle of drift, and change in ground speed. When the time rate of change of ram air temperature, and/or angle of drift, and/or ground speed reaches predetermined amplitudes, the change in temperature, angle of drift, and ground speed is computed from the time the predetermined time rate of change occurs and, if the predetermined time rate of change lasts sufficiently long, the change in temperature, angle of drift, and ground speed reaches a predetermined amplitude and a warning signal is given.

Instead of measuring the angle of drift of the aircraft, the cross-track velocity may be measured.

It is, therefore, an object of this invention to sense clear air turbulence.

It is also an object of this invention to sense changes in ram air temperature to compute the existence of an excessive time rate of change of said temperature and to compute the change in said temperature during said excessive time rate of change.

It is another object of this invention to sense the angle of drift of a supporting aircraft, to compute the existence of an excessive time rate of change in said angle of drift, and to compute the change in said angle of drift during said excessive time rate of change.

It is another object of this invention to sense the ground speed of a supporting aircraft to compute the existence of an excessive time rate of change of said ground speed, and to compute the the change in said ground speed during said excessive time rate of change.

It is another object of this invention to generate temperature warning, angle of drift warning, and ground speed warning signals indicative of clear air turbulence.

It is a further object of this invention to sense said temperature warning, angle of drift warning, and ground speed warning signals at least two-at-a-time.

It is a further object of this invention to sense a cross-track velocity of a supporting aircraft to compute the existence of an excessive time rate of change of said cross-track velocity, and to compute the change in cross-track velocity during said excessive time rate of change.

It is a more specific object of this invention to monitor a plurality of parameters which are indicative of clear air turbulence, to compute the time rates of change of said parameters, to compute the change in each of said parameters during the period when its associated time rate of change exceeds a predetermined magnitude to generate signals when said computed changes exceed predetermined amplitudes, and to produce a warning of clear air turbulence when at least two of said signals are generated.

It is also a specific object to provide methods and apparatus for achieving the above-enumerated objects.

Other objects will become apparent from the following description taken in connection with the single drawing which is a block diagram of a typical clear air turbulence detector in accordance with this invention.

Referring to the figure, a means 10 for sensing ram air temperature is placed in the supporting aircraft. For example, a thermocouple may be used to generate a measure of the ram air temperature. The signal from the means for sensing ram air temperature 10 is connected to a differentiating means 12 to generate a signal which is a measure of the time rate of change of the ram air temperature. The differentiating means 12 may—for example—be an R-C differentiator, a differentiator using an operational amplifier and a feedback loop, or other differentiating means well known in the art. The output of differentiating means 12 is connected to the input of a level detector 14 which is adapted to generate a signal when the time rate of change of ram air temperature exceeds a predetermined magnitude. The output signals of differentiating means 12 and level detector 14 are connected to the input of an integrator 16. The integrator 16 starts to integrate when a signal appears at the output of level detector 14 and is zero-set when no signal is present at the output of level detector 14. The integrated signal at the output of integrator 16 is connected to a meter 18 so that it may be read and is connected to a level detector 20 to generate a temperature warning signal when the output of integrator 16 exceeds a predetermined amplitude.

A means 22 for sensing the angle of drift of a supporting aircraft is connected to the input of a differentiating means 24 whose output is a measure of the time rate of change of the angle of drift. The output signal of differentiating means 24 is connected to a level detector 26 to generate a signal when the output of differentiating means 24 exceeds a predetermined amplitude. The output of level detector 26 and differentiating means 24 is connected to the input of integrator 28 which integrates only when a signal appears at the output of level detector 26 and is zero-set when no signal is present at the output of level detector 26. The output of integrator 28 is connected to a meter 30 where it may be read and is connected to the input of a level detector 32 which is adapted to generate an angle of drift warning signal when the output of integrator 28 exceeds a predetermined amplitude.

A means 34 for sensing the ground speed of the supporting aircraft is connected to the input of a differentiating means 36 to generate a signal which is a measure of the ground acceleration of the supporting vehicle. The output of differentiating means 36 is connected to a level detector 38 to generate a signal when the ground acceleration of the supporting aircraft exceeds a predetermined amplitude. The outputs of differentiating means 36 and level detector 38 are connected to the input of integrator 40 to integrate the signal from differentiating means 36 when a signal is present at the output of level detector 38. When no signal is present at the output of level detector 38, the integrator 40 is set to zero. The output of integrator 40 is connected to a meter 42 where it may be read. The output of integrator 40 is also connected to a level detector 44 which is adapted to generate a ground speed warning signal when the output of integrator 40 exceeds a predetermined amplitude.

The means 22 for sensing angle of drift and the means 34 for sensing ground speed may—for example—be a Doppler radar. Alternatively, in place of the means for sensing angle of drift 22, a means for sensing the cross-track velocity of the supporting craft may be used and connected in the same fashion as the means for sensing angle of drift 22.

The ram air temperature, angle of drift, cross-track velocity, and ground speed of the supporting vehicle are each parameters which signal the presence of clear air turbulence if their gradient is sufficiently high and persists sufficiently long.

The temperature warning signal, angle of drift warning signal, and ground speed warning signal from level detectors 20, 32, and 44 are connected to the input of a gate 50. The gate 50 may be adapted to receive only the three signals shown or may be adapted to receive more or fewer input signals. In a preferred embodiment of the invention, the gate 50 is adapted to generate an output signal when at least two of the input signals are present. To require that all three input signals be present or that more than three input signals be present would be to place too high a requirement on the equipment so that the majority of clear air turbulence wind shears would not be detected. To require that a clear air turbulence warning be given each time one of the particular parameters generates a warning signal, would mean that there would be too many false alarms indicating that the supporting aircraft is approaching a clear air turbulence region.

A typical gate 50—for example—may be comprised of a plurality of AND gates, each of which receive two of the input signals, and all of the AND gates would be connected to an OR gate to generate a warning signal.

The output of gate 50 is preferably connected to a lock and reset circuit 52 and a warning horn, bell, light, or the like 54. The lock and reset circuit 52 is adapted to cause the warning signal 54 to remain on until it is turned off manually—for example—by pressing a button.

Thus, the device of this invention comprises a means for monitoring a plurality of parameters which are indicative of clear air turbulence, a means for computing the time rates of change of said parameters, a means for computing the change in each of the said parameters during the period when its associated time rate of change exceeds a predetermined magnitude, a means for generating signals when said computed changes exceed predetermined amplitudes, and a means for producing a warning of clear air turbulence when at least two of said signals are generated.

The invention also includes the process or method of monitoring a plurality of parameters which are indicative of clear air turbulence, computing the time rates of change of said parameters, computing the change in each of said parameters during the period when its associated time rate of change exceeds a predetermined magnitude, generating signals when said computer changes exceed predetermined amplitude, and producing a warning of clear air turbulence when at least two of said signals are generated.

The exceedingly useful device of this invention, it is anticipated, will substantially reduce the threat of clear air turbulence which is important in high altitude, high speed aircraft both of present-day configuration and of supersonic configuration.

I claim:
1. In combination:
   means for monitoring a plurality of parameters that are indicative of clear air turbulence;
   differentiating means, connected to said means for monitoring parameters, to compute the time rates of change of said parameters;
   computing means, connected to said differentiating means to compute the change in each of said parameters during the period when its associated time rate of change exceeds a predetermined magnitude;
   means, connected to said computing means for generating signals when said computed changes exceed predetermined amplitudes; and
   gating means connected to receive said last named signals to generate a warning of clear air turbulence when at least two of said signals are generated.

2. A device as recited in claim 1 in which said parameters are ram air temperature, drift angle, and ground speed.

3. A device as recited in claim 1 in which said parameters are ram air temperature, cross-track velocity, and ground velocity.

4. In combination:
   means for sensing ram air temperature and for generating a first signal which is a measure of said ram air temperature;
   first differentiating means to generate a second signal which is a measure of the time rate of change of said first signal;
   a first level detector connected to receive said second signal and to generate a third signal when said second signal exceeds a predetermined amplitude;
   first integrating means, connected to start integration when said third signal is generated and connected to integrate said second signal, said first integrating means being adapted to zero set when said third signal disappears;
   a second level detector, connected to the output of said first integrating means to generate a fourth signal when the output signal of said first integrating means exceeds a predetermined amplitude;
   means for sensing the angle of drift of a supporting vehicle and for generating a fifth signal which is a measure of said angle of drift;
   second differentiating means, connected to differentiate said fifth signal to generate a sixth signal;
   a third level detector, connected to receive said sixth signal and to generate a seventh signal when said sixth signal exceeds a predetermined amplitude;
   second integrating means, connected to start integration when said seventh signal appears and to zero set when said seventh signal disappears, and connected to integrate said sixth signal;
   a fourth level detector, connected to receive the output of said second integrating means and to generate an eighth signal when the output of said second integrating means exceeds a predetermined amplitude;
   means for sensing the speed of a supporting vehicle with respect to the ground and for generating a ninth signal which is a measure of said speed;
   third differentiating means, connected to receive said ninth signal and to generate a tenth signal which is a measure of the time rate of change of said ninth signal;
   a fifth level detector, connected to receive said tenth signal and to generate an eleventh signal when said tenth signal exceeds a predetermined amplitude;
   third integrating means, connected to receive said eleventh signal and to commence integration when said eleventh signal appears and to zero set when said eleventh signal is zero, said third integrating means being connected to integrate said tenth signal;

a sixth level detector, connected to generate a twelfth signal when the output of said third integrating means exceeds a predetermined amplitude;

gating means connected to receive said fourth, eighth and twelfth signals; and warning means, connected to be operated by the output of said gating means.

5. The device as recited in claim 4 in which said gating means is adapted to generate an output signal upon the concurrence of two input signals.

6. In combination:

means for sensing ram air temperature and for generating a first signal which is a measure of said ram air temperature;

first differentiating means to generate a second signal which is a measure of the time rate of change of said first signal;

a first level detector connected to receive said second signal and to generate a third signal when said second signal exceeds a predetermined amplitude;

first integrating means, connected to start integration when said third signal is generated and connected to integrate said second signal, said first integrating means being adapted to zero set when said third signal disappears;

a second level detector, connected to the output of said first integrating means to generate a fourth signal when the output signal of said first integrating means exceeds a predetermined amplitude;

means for sensing the cross-track velocity of a supporting vehicle and for generating a fifth signal which is a measure of said cross-track velocity;

second differentiating means, connected to differentiate said fifth signal and generate a sixth signal;

a third level detector, connected to receive said sixth signal and to generate a seventh signal when said sixth signal exceeds a predetermined amplitude;

second integrating means, connected to start integration when said seventh signal appears and to zero set when said seventh signal disappears, and connected to integrate said sixth signal;

a fourth level detector, connected to receive the output of said second integrating means and to generate an eighth signal when the output of said second integrating means exceeds a predetermined amplitude;

means for sensing the speed of said supporting vehicle with respect to the ground and for generating a ninth signal which is a measure of said speed;

third differentiating means, connected to receive said ninth signal and to generate a tenth signal which is a measure of the time rate of change of said ninth signal;

a fifth level detector, connected to receive said tenth signal and to generate an eleventh signal when said tenth signal exceeds a predetermined amplitude;

third integrating means, connected to receive said eleventh signal and to commence integration when said eleventh signal appears and to zero set when said eleventh signal is zero, said third integrating means being connected to integrate said tenth signal;

a sixth level detector, connected to generate a twelfth signal when the output of said third integrating means exceeds a predetermined amplitude;

gating means, connected to receive said fourth, eighth, and twelfth signals; and warning means, connected to be operated by the output of said gating means.

7. The device as recited in claim 6 in which said gating means is adapted to generate an output signal upon the concurrence of two input signals.

8. Means for sensing the presence of clear air turbulence comprising:

first, second, and third analog computing means whose outputs are connected to the input of a gate, each said analog computing channel comprising a differentiating means, a first level detector connected to the output of said differentiating means, an integrator connected to integrate the output signal of said differentiating means and connected to be zero set by the absence of a signal at the output of said level detector, and a second level detector, connected to generate a signal when said integrator output signal amplitude exceeds a predetermined amplitude;

means for sensing the ram air temperature measured on a supporting vehicle and for generating a signal which is a measure of said ram air temperature, connected to the input of said first analog computing channel;

means for sensing the angle of drift of said supporting vehicle and for generating a signal which is a measure of said angle of drift, connected to the input of said second analog computing channel;

means for sensing the ground speed of a supporting vehicle and for generating a signal which is a measure of said ground speed, connected to the input of said third analog computing channel.

9. A device as recited in claim 8 in which said level detectors are set to give different weights to the outputs of said various computing channels and further comprising warning means connected to the output of said gate.

10. A device as recited in claim 8 in which said means for sensing angle of drift comprises means for sensing the cross-track velocity of a supporting vehicle.

References Cited

UNITED STATES PATENTS

| | | | |
|---|---|---|---|
| 2,942,119 | 6/1960 | King et al. | 340—25 X |
| 2,955,761 | 10/1960 | Brown et al. | 73—178 X |
| 3,272,973 | 9/1966 | MacCready | 73—178 X |

JOHN W. CALDWELL, *Primary Examiner.*

KENNETH N. LEIMER, *Assistant Examiner.*

U.S. Cl. X.R.

73—178; 235—150.2, 183